(12) United States Patent
Ito

(10) Patent No.: US 9,639,793 B2
(45) Date of Patent: May 2, 2017

(54) PRINTING SYSTEM DISPLAYING REGISTRATION SCREEN FOR REGISTRATION OF ATTRIBUTES OF PRINTING MEDIA

(71) Applicant: SEIKO EPSON CORPORATION, Tokyo (JP)

(72) Inventor: Akemi Ito, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/334,817

(22) Filed: Jul. 18, 2014

(65) Prior Publication Data
US 2015/0062622 A1 Mar. 5, 2015

(30) Foreign Application Priority Data
Aug. 30, 2013 (JP) ................................. 2013-179102

(51) Int. Cl.
| | | |
|---|---|---|
| *G06F 3/12* | (2006.01) | |
| *G06K 15/00* | (2006.01) | |
| *B65H 7/20* | (2006.01) | |
| *B65H 3/44* | (2006.01) | |
| *B65H 1/26* | (2006.01) | |
| *G03G 15/00* | (2006.01) | |

(52) U.S. Cl.
CPC ......... *G06K 15/4065* (2013.01); *B65H 1/266* (2013.01); *B65H 3/44* (2013.01); *B65H 7/20* (2013.01); *G03G 15/6508* (2013.01); *B65H 2405/332* (2013.01); *B65H 2511/416* (2013.01); *B65H 2511/51* (2013.01); *B65H 2551/18* (2013.01); *G03G 15/502* (2013.01); *G06K 15/005* (2013.01)

(58) Field of Classification Search
CPC ........ G06F 15/00; G06K 15/00; G06K 15/02; G06G 15/00
See application file for complete search history.

(56) References Cited

U.S. PATENT DOCUMENTS

| | | | |
|---|---|---|---|
| 6,512,599 B1 * | 1/2003 | Hattori | H04N 1/00206 358/400 |
| 2004/0141203 A1 * | 7/2004 | Honma | G06F 3/1205 358/1.15 |
| 2004/0218197 A1 * | 11/2004 | Vliembergen | G06K 15/00 358/1.6 |
| 2005/0084314 A1 * | 4/2005 | Anderson | G06F 3/1207 400/625 |

(Continued)

FOREIGN PATENT DOCUMENTS

JP 2002-278377 A 9/2002

*Primary Examiner* — Henok A Shiferaw
(74) *Attorney, Agent, or Firm* — Global IP Counselors, LLP

(57) ABSTRACT

A printing system includes a plurality of loading units, and a registration management unit configured to display on a display screen a registration screen for receiving registration of attributes of printing media loaded in the loading unit. The registration management unit is configured to arrange selection elements corresponding to unregistered loading units so as to be selectable on the registration screen, and is configured to arrange on the registration screen registration elements for registering the attributes of the printing media loaded in the loading unit corresponding to a selected selection element.

9 Claims, 11 Drawing Sheets

(56) References Cited

U.S. PATENT DOCUMENTS

| | | | |
|---|---|---|---|
| 2006/0262337 A1* | 11/2006 | Kamata | G06F 3/1211 358/1.13 |
| 2006/0285900 A1* | 12/2006 | Kurita | G03G 15/6573 399/361 |
| 2008/0063424 A1* | 3/2008 | Tanaka | G03G 15/70 399/79 |
| 2008/0141167 A1* | 6/2008 | Kubo et al. | 715/796 |
| 2009/0009783 A1* | 1/2009 | Negishi | G03G 15/5095 358/1.9 |
| 2009/0184456 A1* | 7/2009 | Nishii | G06K 15/005 271/9.01 |
| 2012/0224198 A1* | 9/2012 | Kawabata | G06K 15/1882 358/1.9 |

* cited by examiner

PRINTING SYSTEM DISPLAYING REGISTRATION SCREEN FOR REGISTRATION OF ATTRIBUTES OF PRINTING MEDIA

CROSS-REFERENCE TO RELATED APPLICATIONS

This application claims priority to Japanese Patent Application No. 2013-179102 filed on Aug. 30, 2013. The entire disclosure of Japanese Patent Application No. 2013-179102 is hereby incorporated herein by reference.

BACKGROUND

Technical Field

The present invention relates to a printing system.

Related Art

In the past, with printing systems in which a plurality of paper feeding cassettes can be mounted, when the paper feeding cassette was mounted to refill or replace the paper, technology is known for displaying a registration screen for registering the size or paper quality of the paper loaded in the paper feeding cassette (see JP-A-2002-278377, for example).

SUMMARY

However, when a plurality of paper feeding cassettes are mounted successively, if registration screens are displayed successively superimposed on each other, there is the problem that it is difficult to understand the correlation between the displayed registration screen and the paper feeding cassette.

The present invention was created to address this kind of problem, and an advantage of some aspect of the printing system of the present invention is to make it easy to register printing media attributes.

(1) A printing system to achieve the object noted above is equipped with a plurality of loading units configured to be loaded with a plurality of printing media, respectively, a printing unit configured to take out the printing media from a selected loading unit, and configured to print on the printing media that has been taken out, and a registration management unit configured to display on a display screen a registration screen for receiving registration of attributes of the printing media loaded in the loading unit for which a designated operation has been performed, and configured to store the attributes of the printing media for which registration has been received using the registration screen. The registration management unit is configured to arrange selection elements individually corresponding to unregistered loading units so as to be selectable on the registration screen after the designated operation is done, and is configured to arrange on the registration screen registration elements for registering the attributes of the printing media loaded in the loading unit corresponding to a selected selection element.

With the present invention, to make it possible to select a registration element for correlating with a specific loading unit and registering the printing media attributes, selection elements for selecting that specific loading unit are arranged on the registration screen, so it is easy to respectively correlate the plurality of printing media to the plurality of loading units in which they are loaded, and to register the printing media attributes. Here, the registration screen is an image constituting a designated area of the display device screen, and can be an image of the entire screen of the display device, or can be an image constituting a continuous area of a portion of the display device screen.

(2) With the printing system for achieving the object noted above, the selection elements can be tabs.

By using this constitution, it is easy to recognize the selection status of the selection elements, and it is also easy to recognize whether any of the registration elements arranged on the registration screen corresponds to any of the selection elements.

(3) With the printing system for achieving the object noted above, the registration management unit, upon arranging the selection elements on the registration screen, can also be configured to arrange the respective selection elements on the registration screen in a positional relationship corresponding to a positional relationship of the loading units relative to each other.

By using this constitution, it is easy to recognize the correlation between the selection elements and the loading units.

(4) With the printing system for achieving the object noted above, the registration management unit, upon arranging the selection elements on the registration screen, configured to arrange the respective selection elements on the registration screen in a positional relationship corresponding to a sequence in which the designated operation has been performed.

By using this constitution, it is easy to recognize the correlation between the selection elements and the loading units.

(5) With the printing system for achieving the object noted above, the designated operation includes loading of the printing media to the loading unit, and it is possible to have the registration management unit configured not to arrange on the registration screen the selection elements and the registration elements for the loading units in which the printing media are not loaded.

By using this constitution, it is possible to prevent the arrangement of selection elements and registration elements on the registration screen for loading units for which it is meaningless to register corresponding printing media attributes.

(6) With the printing system for achieving the object noted above, it is possible to further be equipped with a print instruction unit configured to select any of the loading units and give printing instructions. The registration management unit, when the loading unit for which the corresponding selection element is arranged on the registration screen is selected and the printing is instructed, can be configured to remove the selection element corresponding to the selected loading unit from the registration screen, and be configured to store attributes specified with the instructed printing as the attributes of the printing media loaded in the selected loading unit.

By using this constitution, it is possible to omit the operation of the user registering the printing media attributes using the registration screen.

(7) With the printing system for achieving the object noted above, the registration elements can also include a collective registration button for performing collective registration of attributes for all the selection elements arranged on the registration screen.

By using this constitution, it is possible to reduce the number of operations for registering the printing media attributes using the registration screen.

(8) With the printing system for achieving the object noted above, the registration elements can also include an individual registration button for registering attributes of the selected selection element.

By using this constitution, it is possible for the user to remove selection elements from the registration screen with each registration.

BRIEF DESCRIPTION OF THE DRAWINGS

Referring now to the attached drawings which form a part of this original disclosure.

DETAILED DESCRIPTION OF EXEMPLARY EMBODIMENTS

Following, we will describe modes of carrying out the invention while referring to the attached drawings. Note that for corresponding constitutional elements in each drawing, the same code numbers are given, and redundant descriptions will be omitted.

1. Printing System Constitution

Figure 1:
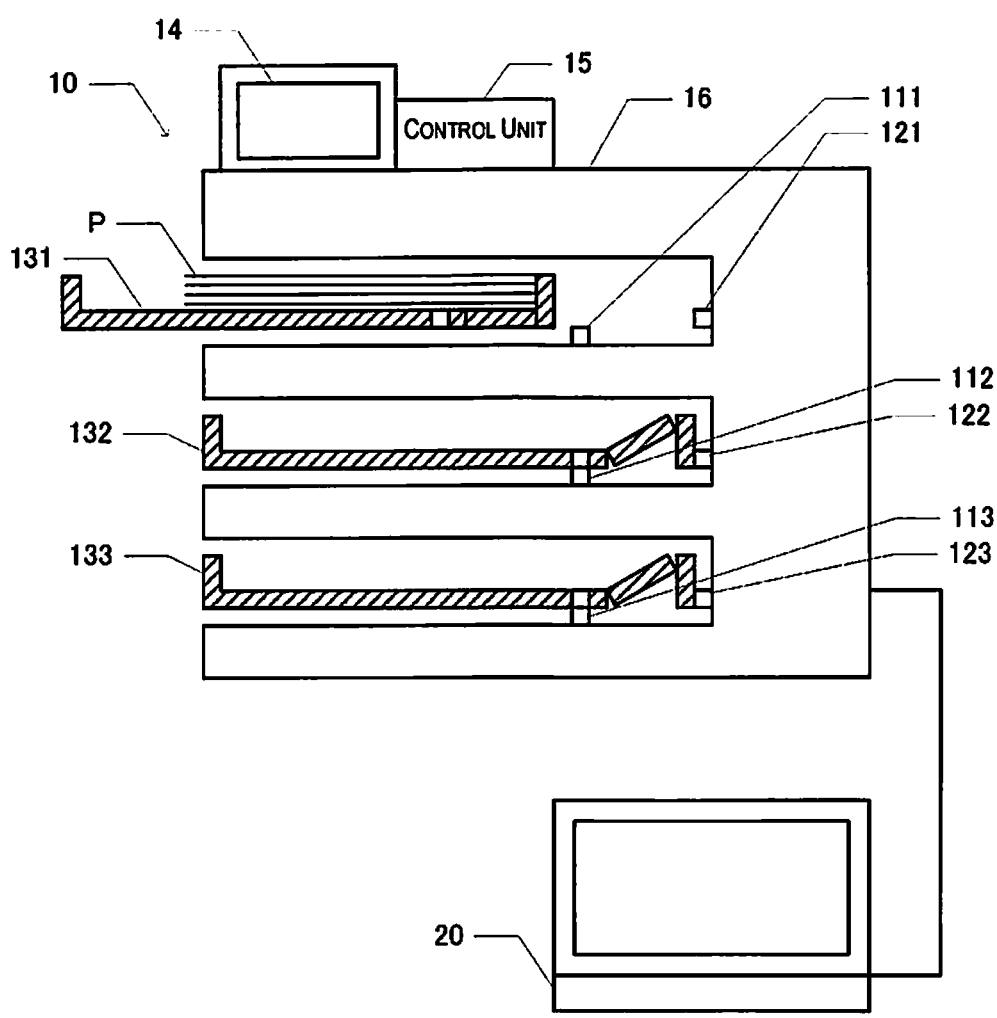
FIG. 1 is a pattern diagram of one embodiment of the present invention.

The constitution of a printing system 1 as an embodiment of the present invention is shown in FIG. 1. A copy machine 10 is equipped with a first paper feeding cassette 131, a second paper feeding cassette 132, a third paper feeding cassette 133, a printing unit 16, a scanner (not illustrated), an operating unit 14, and a control unit 15. The copy machine 10 as a standalone unit can do copying, image reading, and printing. Also, a PC 20 is able to give instructions to the copy machine 10 to print or read an image by executing a control program of the copy machine 10. It is possible to connect to the copy machine 10 a plurality of this kind of PC 20 or mobile information terminals to give instructions to the copy machine to print or read an image. The printing system 1 is constituted by the copy machine 10 as a standalone unit, or by the copy machine 10 and these information terminals for giving instructions to the copy machine 10 to print or the like.

The first paper feeding cassette 131, the second paper feeding cassette 132, and the third paper feeding cassette 133 as loading units are respectively boxes in which it is possible to load a plurality of papers P. The first paper feeding cassette 131, the second paper feeding cassette 132, and the third paper feeding cassette 133 can be mounted in the printing unit 16 and removed from the printing unit 16.

On the printing unit 16 are provided a plurality of conveyance rollers (not illustrated) for taking out one sheet at a time the paper P as the printing media loaded into the first paper feeding cassette 131, the second paper feeding cassette 132, and the third paper feeding cassette 133 and conveying it to a printing head (not illustrated). Any kind of printing method can be used for the printing head, including an inkjet method, laser method, lithography method or the like.

On the printing unit 16 are equipped attachment-detachment sensors 121, 122, and 123 for detecting whether or not the first paper feeding cassette 131, the second paper feeding cassette 132, or the third paper feeding cassette 133 is mounted. For the attachment-detachment sensors 121, 122, and 123, it is possible to use a contact method or possible to use a non-contact method.

On the printing unit 16 are equipped paper sensors 111, 112, and 113 for detecting whether or not one or more sheets of paper P are loaded in the first paper feeding cassette 131, the second paper feeding cassette 132, or the third paper feeding cassette 133 in a state mounted in the printing unit 16. It is possible to use a non-contact method or possible to use a contact method for the paper sensors 111, 112, and 113. Also, instead of providing a paper sensor on the printing unit 16, it is also possible to provide paper sensors respectively on the first paper feeding cassette 131, the second paper feeding cassette 132, or the third paper feeding cassette 133 and to connect with the control unit 15.

The operating unit 14 is a touch panel that functions as a print instruction unit. Of course, it is also possible to combine a display panel that does not have a touch function with operating buttons, or to use another constitution.

The control unit 15 is equipped with a processor, memory, non-volatile external storage device, input/output circuit, image processing ASIC and the like which are not illustrated. The control unit 15 controls the printing unit 16 and the operating unit 14 by reading firmware from the non-volatile external storage device to memory and executing it on the processor. The control unit 15 functions as a registration management unit when a UI module constituting the firmware is being executed.

2. Paper Registration Tab Display

Figure 2:
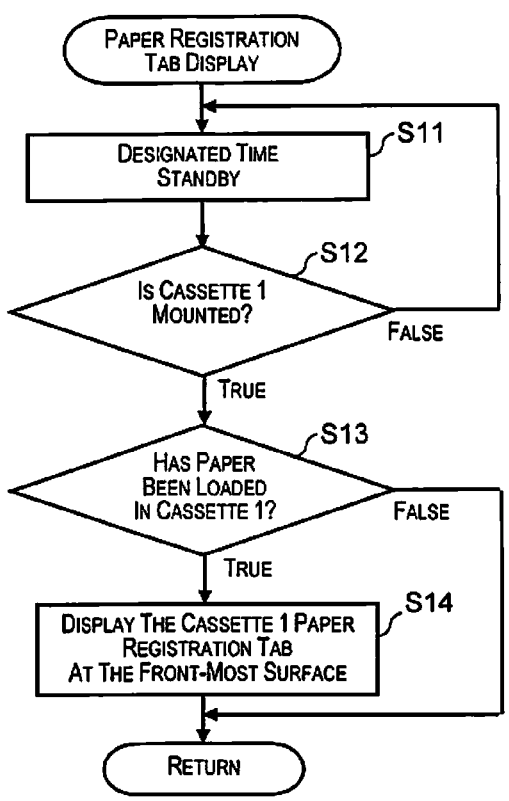
FIG. 2 is a flow chart of the embodiment of the present invention.

Based on the output of the paper sensors 111, 112, and 113, the control unit 15 detects that the paper of the first paper feeding cassette 131, the second paper feeding cassette 132, or the third paper feeding cassette 133 has run out. When the paper runs out for any of the first paper feeding cassette 131, the second paper feeding cassette 132, or the third paper feeding cassette 133, the control unit 15 notifies the user that paper has run out for any of the first paper feeding cassette 131, the second paper feeding cassette 132, or the third paper feeding cassette 133 by text, an image, voice, or indicator light flashing or the like. When it is detected based on the output of the attachment-detachment sensors 121, 122, or 123 that the first paper feeding cassette 131, the second paper feeding cassette 132, or the third paper feeding cassette 133 has been removed from the printing unit 16 to refill or replace the paper, the paper registration tab display process shown in FIG. 2 is executed for the paper feeding cassette removed from the printing unit 16. Hereafter, we will describe the paper registration tab display process executed when the first paper feeding cassette 131 is removed from the printing unit 16 as an example.

To start with, the control unit 15 is in standby for a designated time set in advance (S11).

Next, based on the output of the attachment-detachment sensor 121, the control unit 15 determines whether or not the first paper feeding cassette 131 is mounted in the printing unit 16 (S12). When the first paper feeding cassette 131 is not mounted in the printing unit 16, the control unit 15 returns to step S11, and stands by for the designated time.

When the first paper feeding cassette 131 is mounted in the printing unit 16, based on the output of the paper sensor 111, the control unit 15 determines whether or not one or more sheets of the paper P are loaded in the first paper feeding cassette 131 (S13).

When one or more sheets of the paper P are not loaded in the first paper feeding cassette 131, the control unit 15 ends the paper registration tab display process. The determination that one or more sheets of the paper P are not loaded in the first paper feeding cassette 131 mounted in the printing unit 16 means that an empty first paper feeding cassette 131 is mounted in the printing unit 16 without loading paper in the first paper feeding cassette 131 though the user removed the first paper feeding cassette 131 from the printing unit 16. For example, even if the paper feeding cassette is mounted in the printing unit 16, when one or more sheets of the paper P are not loaded in that paper feeding cassette, the control unit 15 ends the paper registration tab display process and does not display the paper registration tab. Because of this, there is not the problem of being forced to do a meaningless operation of registering the paper attributes, or the operation of hiding the paper registration tab for that paper feeding cassette despite the fact that the user mounted the paper feeding cassette into the printing unit 16 without loading paper in it.

When one or more sheets of the paper P are loaded in the first paper feeding cassette 131, the control unit 15 displays the paper registration tab of the first paper feeding cassette 131 at the front-most surface of the operating unit 14 (S14). Here, we will describe the display of the operating unit 14. The image displayed on the operating unit 14 is formed by the control unit 15. When the image displayed on the operating unit 14 is formed, the control unit 15 correlates it with a layer and stores it. In specific terms, for example, storage areas corresponding to the overall display area of the operating unit 14 to match the number of layers are ensured in the memory. Specifically, the bundle of storage areas corresponding to the overall display area of the operating unit 14 is the layer. Then, when the control unit 15 forms the image displayed on the operating unit 14, it selects one layer, and stores that image in the address corresponding to the display area of that layer. A display priority order is set for each layer. When respective images are stored in the same display area of different layers, the control unit 15 displays the image stored in the storage area with the higher display priority on the operating unit 14. Therefore, by storing the image as the paper registration tab of the first paper feeding cassette 131 in the topmost layer, the paper registration tab of the first paper feeding cassette 131 is displayed at the front-most surface of the operating unit 14.

The control unit 15 activates this kind of paper registration tab display process each time the paper feeding cassette is removed from the printing unit 16. When the plurality of paper feeding cassettes are removed from the printing unit 16, the control unit 15 executes the plurality of paper registration tab display processes while switching processes in short time intervals.

3. Paper Registration Tab

Figure 3A:
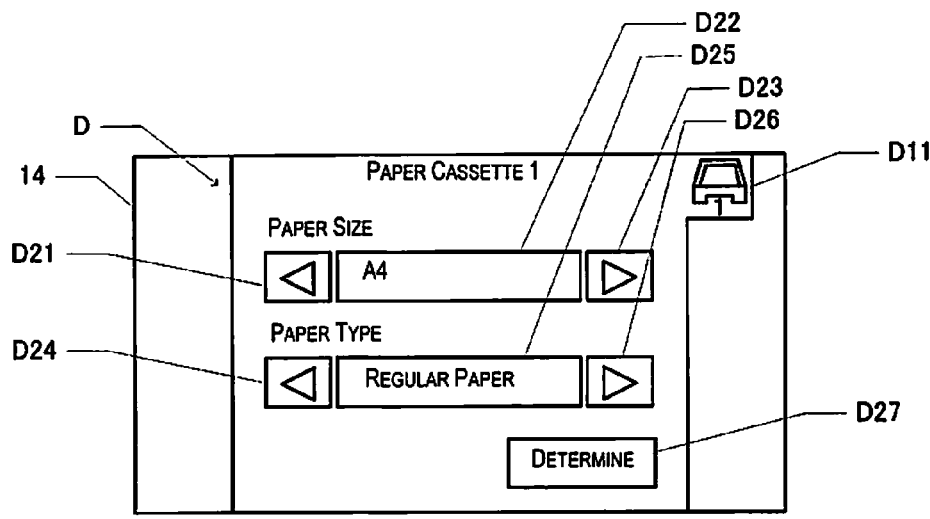
FIGS. 3A, 3B, and 3C are screen transition diagrams of the embodiment of the present invention.
Figure 3B:
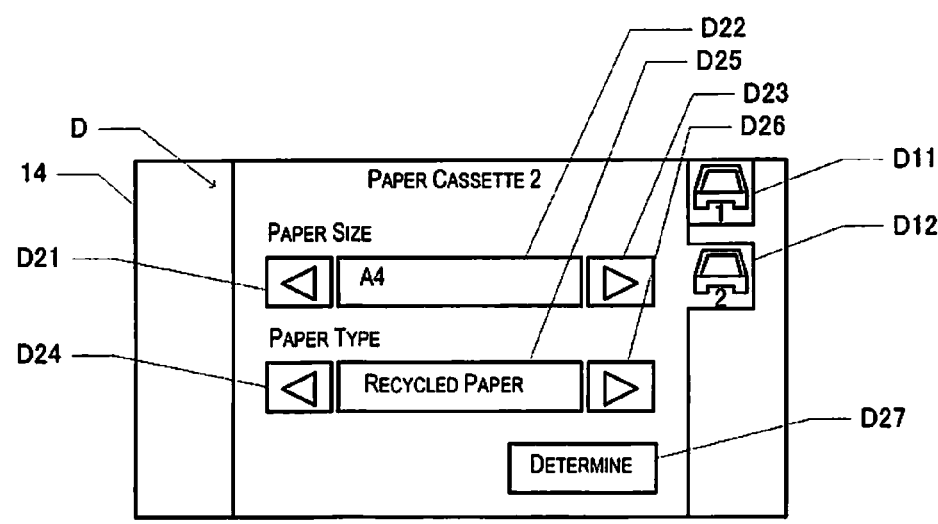
Figure 3C:
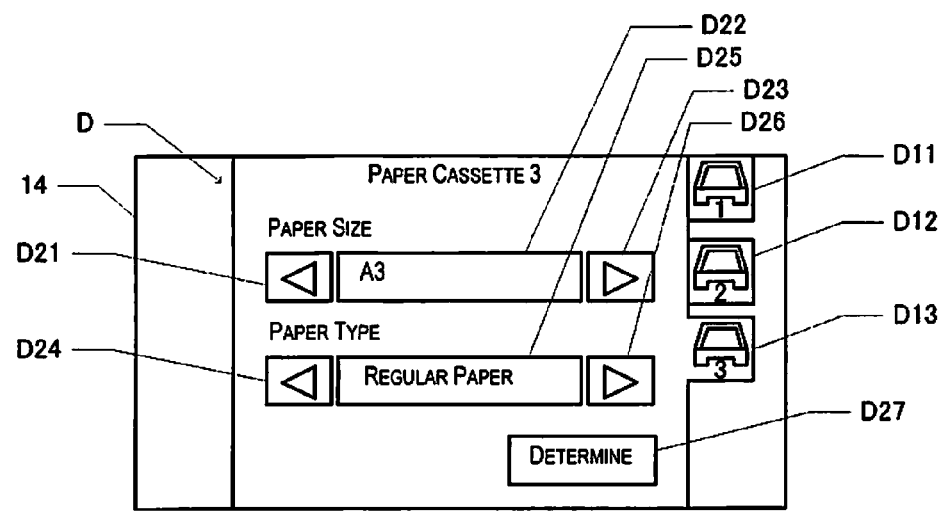

Next, we will describe the constitution of the paper registration tab while referring to FIGS. 3A, 3B, and 3C.

The paper registration tab D11 shown in FIG. 3A is the screen constitution element for receiving registration of the attributes of the paper loaded in the first paper feeding cassette 131. Arranged in the paper registration tab D11 as registration elements are a text box D22 for displaying the paper size, a text box D25 for displaying the paper type selection buttons D21 and D23 for changing the paper size, selection buttons D24 and D26 for changing the paper type, and a determination button D27. When the first paper feeding cassette 131 is removed from the printing unit 16, the control unit 15 sets the paper attributes correlated to the first paper feeding cassette 131 and stored to the initial values of the text boxes D22 and D25. With this embodiment, paper size and paper type are set as the paper attributes, but it is also possible to set only one of these.

When an area in which the selection button D21 or the selection button D23 of the operating unit 14 is displayed is indicated by being touched by the user, of the plurality of values set in advance as the paper sizes that can be selected, the control unit 15 selects any one that differs from the value currently displayed in the text box D22, and displays the selected value in the text box D22. When the user touches the area in which is displayed the selection button D24 or the selection button D26 of the operating unit 14, of the plurality of values set in advance as the paper types that can be selected, the control unit 15 selects any one that is different from the value currently displayed in the text box D25, and displays the selected value in the text box D25. When the user touches the area in which is displayed the determination button D27 of the operating unit 14, the control unit 15 correlates the paper size displayed in the text box D22 and the paper type displayed in the text box D25 to the first paper feeding cassette 131 and stores them.

The paper registration tab 012 shown in FIG. 3B is a screen constitutional element for receiving registration of the attributes of paper loaded in the second paper feeding cassette 132. The control unit 15 correlates the text box D22, the text box D25, the selection buttons D21, D23, D24, and D26, and the determination button D27 arranged on the paper registration tab D12 to the second paper feeding cassette 132 and manages them. Specifically, when the second paper feeding cassette 132 is removed from the printing unit 16, the paper attributes correlated to the second paper feeding cassette 132 and stored are set to the initial values of the text boxes D22 and D25 arranged on the paper registration tab D12. Also, when the user touches the area in which the determination button D27 is displayed, the control unit 15 correlates the paper size displayed in the text box D22 arranged in the paper registration tab D12 and the paper type displayed in the text box D25 arranged in the paper registration tab D12 with the second paper feeding cassette 132 and stores them.

The paper registration tab D13 shown in FIG. 3C is a screen constitutional element for receiving registration of the attributes of paper loaded in the third paper feeding cassette 133. The control unit 15 correlates the text box D22, the text box D25, the selection buttons D21, D23, D24, and D26, and the determination button D27 arranged on the paper registration tab D13 to the third paper feeding cassette 133 and manages them. Specifically, when the third paper feeding cassette 133 is removed from the printing unit 16, the paper attributes correlated to the third paper feeding cassette 133 and stored are set to the initial values of the text boxes D22 and D25 arranged on the paper registration tab D13. Also, when the user touches the area in which the determination button D27 is displayed, the control unit 15 correlates the paper size displayed in the text box D22 arranged in the paper registration tab D13 and the paper type displayed in the text box D25 arranged in the paper registration tab D13 with the third paper feeding cassette 133 and stores them.

As shown in FIGS. 3A, 3B, and 3C, the paper registration tabs D11, D12, and D13 have the same shape except for the convex part at the right edge, and the remaining parts except for the convex part of the right edge are displayed in the same area. Then, the respective right edge convex parts of the paper registration tabs D11, D12, and D13 are displayed in different areas. Specifically, the control unit 15 forms the paper registration tabs D11, D12, and D13 in display areas for which different layers are partially superimposed. Therefore, the text box D22, the text box D25, the selection buttons D21, D23, D24, and D26, and the determination button D27 arranged in the paper registration tab other than the topmost layer are hidden. Then, even in a state when any paper registration tab layer is set to the topmost layer, the right edge of all the paper registration tabs D11, D12, and D13 are displayed on the operating unit 14.

The right edge convex parts of the respective paper registration tabs correspond to the selection elements, and are arranged so as to be in a positional relationship corresponding to the equivalent positional relationship of the corresponding paper feeding cassette. Specifically, for example, the right edge convex part of the paper registration tab D11 corresponding to the first paper feeding cassette 131 mounted at the topmost level is arranged in an area further above the screen top than that of the right edge convex part of the paper registration tab D12 and that of the right edge convex part of the paper registration tab D13. Also, the right edge convex part of the paper registration tab D13 corresponding to the second paper feeding cassette 132 mounted at the bottommost level is arranged in an area further down on the screen than that of the right edge convex part of the paper registration tab D11, and than that of the right edge convex part of the paper registration tab D12. Because of that, it is easier for the user to recognize the correlation between the paper feeding cassette and the paper registration tab.

The control unit 15 sets the display priority of the layer of the paper registration tab corresponding to the paper feeding cassette mounted relatively later to be higher than the display priority of the layer of the paper registration tab corresponding to the paper feeding cassette mounted relatively sooner. For example, first, we'll assume that the first paper feeding cassette 131 is first mounted in the printing unit 16. That being the case, as shown in FIG. 3A, the paper registration tab D11 corresponding to the first paper feeding cassette 131 is displayed. In this state, the registration screen D is constituted only by the paper registration tab D11. Then, we'll assume that the second paper feeding cassette 132 is mounted in the printing unit before the user touches the display area of the determination button D27 of the paper registration tab D11 and the attributes of the paper of the first paper feeding cassette 131 are registered. That being the case, as shown in FIG. 3B, the paper registration tab D12 corresponding to the second paper feeding cassette 132 is displayed, and for the paper registration tab D11, the remaining part excluding the right edge convex part is hidden. In this state, the registration screen D is constituted by the paper registration tab D11 and the paper registration tab D12. Furthermore, we'll assume that the third paper feeding cassette 133 is mounted in the printing unit before the user touches the display area of the determination button D27 of the paper registration tab D12 and the attributes of the paper of the second paper feeding cassette 132 are registered. This being the case, as shown in FIG. 3C, the paper registration tab D13 corresponding to the third paper feeding cassette 133 is displayed, and the remaining part excluding the right edge convex part is also hidden for the paper registration tab D12. In this state, the registration screen D is constituted by all of the paper registration tab D11, the paper registration tab D12, and the paper registration tab D13.

4. Switching the Paper Registration Tabs

Figure 4:
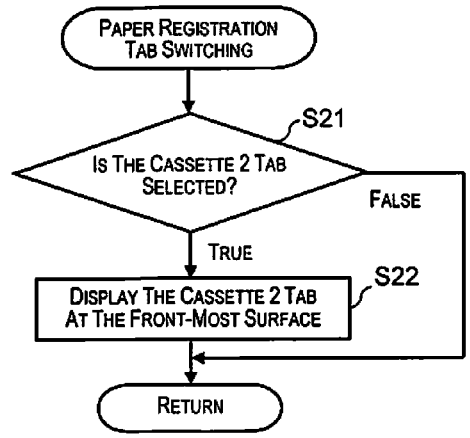
FIG. 4 is a flow chart of the embodiment of the present invention.

FIG. 4 shows the process for switching the paper registration tabs. The paper registration tab switching process shown in FIG. 4 is repeated at short time intervals during the period that the paper registration tab D12 corresponding to the second paper feeding cassette 132 is stored in any of the layers.

Figure 5A:
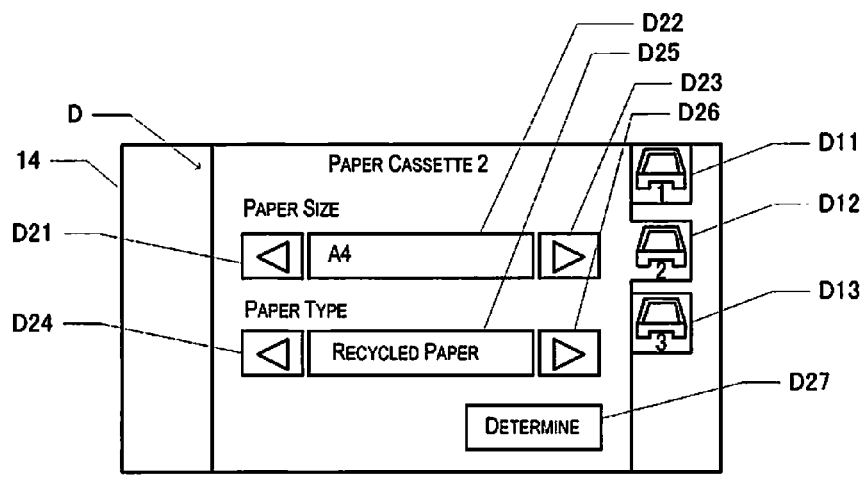
FIGS. 5A and 5B are screen transition diagrams of the embodiment of the present invention.

Based on the output of the operating unit 14, the control unit 15 determines whether or not the user touched the area of the operating unit 14 for which the right edge convex part of any of the paper registration tabs is displayed (S21). When the user has not touched that area, the control unit 15 ends the paper registration tab switching process. When the user has touched that area, the control unit 15 sets the display priority of the layer of the paper registration tab D12 corresponding to the second paper feeding cassette 132 to the highest level. As a result, as shown in FIG. 5A, the entire paper registration tab D12 is displayed on the operating unit 14 (S22).

Figure 5B:
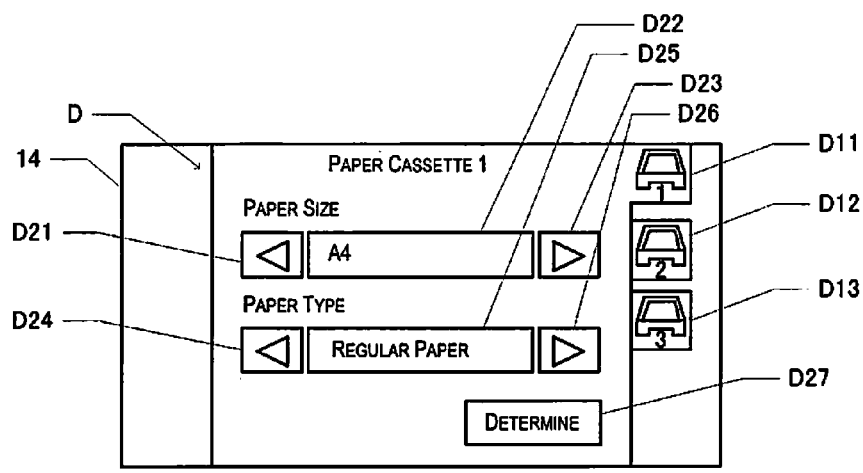

When a paper registration tab is stored in the respective plurality of layers, this kind of paper registration tab switching process is executed for the respective paper registration tabs. Therefore, for example as shown in FIG. 5A, in a state with the entire paper registration tab D12 displayed, when the area of the right edge convex part of the paper registration tab D11 corresponding to the first paper feeding cassette 131 is touched, as shown in FIG. 5B, the entire paper registration tab D11 is displayed. As a result, the text box D22, the text box D25, the section buttons D21, D23, D24, and D25, and the determination button D27 correlated to the first paper feeding cassette 131 are displayed.

5. Deleting the Paper Registration Tab

Figure 6:
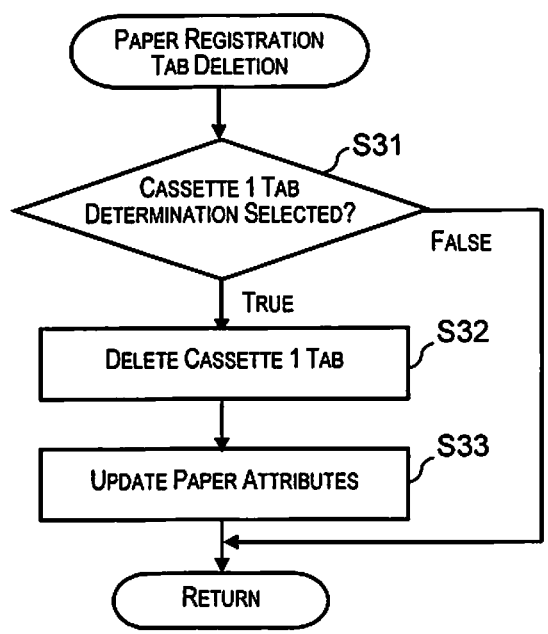
FIG. 6 is a flow chart of the embodiment of the present invention.

FIG. 6 shows the process of deleting the paper registration tab. The paper registration tab deletion process shown in FIG. 6 is repeated in short time intervals during the period when the entire paper registration tab D11 corresponding to the first paper feeding cassette 131 is displayed on the operating unit 14.

Based on the output of the operating unit 14, the control unit 15 determines whether or not the user touched the area in which the determination button D27 of the paper registration tab D11 is displayed, specifically, whether or not the determination button D27 arranged in the paper registration tab D11 has been selected (S31). When the area in which is displayed the determination button D27 arranged in the paper registration tab D11 has not been touched by the user, the control unit 15 ends the paper registration tab deletion process.

Figure 7A:
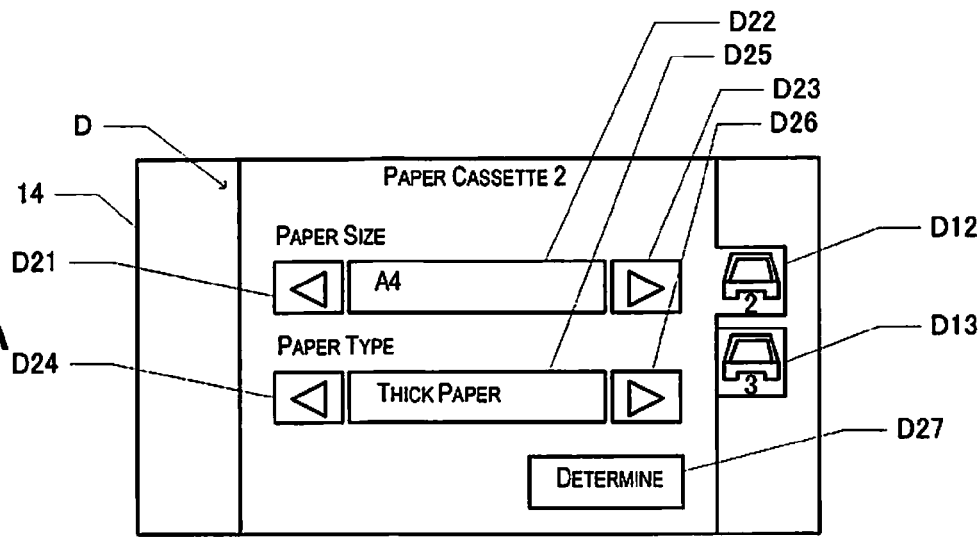
FIGS. 7A and 7B are screen transition diagrams of the embodiment of the present invention.

When the user has touched that area, the control unit 15 deletes the paper registration tab D11 from the layer (S32). As a result, the entire paper registration tab D11 is hidden as shown in FIG. 7A.

Next, the control unit 15 correlates the paper size displayed in the text box D22 arranged on the paper registration tab D11 and the paper type displayed in the text box D25 arranged on the paper registration tab D11 to the first paper feeding cassette 131 and stores them (S33).

Figure 7B:
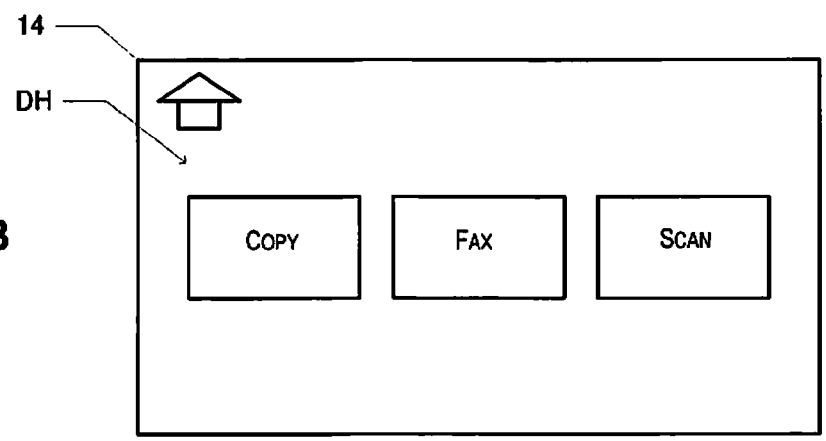

When paper registration tabs are stored in the respective plurality of layers, this kind of paper registration tab deletion process is executed for each respective paper registration tab. Therefore, for example as shown in FIG. 7A, in a state with the entire paper registration tab D13 displayed, when the area of the determination button D27 corresponding to the second paper feeding cassette 132 is touched, the paper registration tab D12 is hidden, and the entire paper registration tab D13 is displayed. Furthermore, in a state with the entire paper registration tab D13 displayed, when the area of the determination button D27 corresponding to the third paper feeding cassette 133 is touched, the paper registration tab D13 is hidden. The control unit 15 stores the initial screen at a layer of a lower level than the layer in which the paper registration tab is stored. Therefore, in a state with all the paper registration tabs hidden, for example the initial screen DH shown in FIG. 7B is displayed on the operating unit 14.

6. Cancelling Paper Registration

Figure 8:
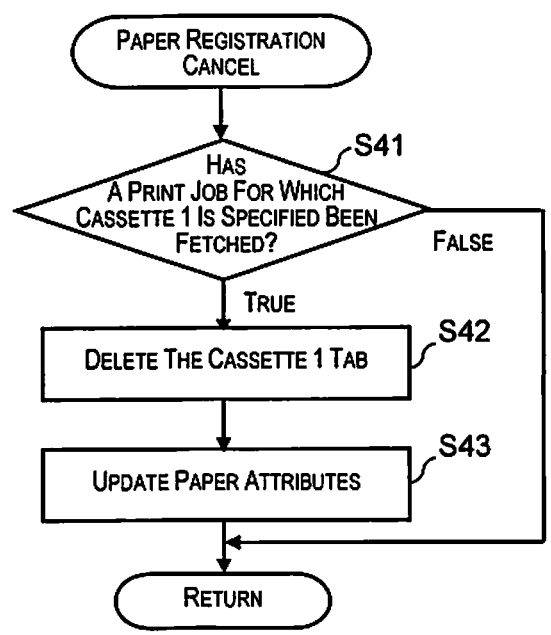
FIG. 8 is a flow chart of the embodiment of the present invention.

FIG. 8 shows the process of cancelling paper registration. The paper registration cancellation process shown in FIG. 8 is repeated for a short time interval during the period that all or a part of the paper registration tab D11 corresponding to the first paper feeding cassette 131 is displayed on the operating unit 14. The same paper registration cancellation process is executed for the paper registration tab D12 corresponding to the second paper feeding cassette 132 and the paper registration tab D13 corresponding to the third paper feeding cassette 133 as well, so a description is omitted.

First, the control unit 15 determines whether or not a print job for which the first paper feeding cassette 131 is selected has been fetched (S41). When a print job for which the first paper feeding cassette 131 is selected has not been fetched, the control unit 15 ends the paper registration cancellation process corresponding to the first paper feeding cassette 131.

When a print job for which the first paper feeding cassette 131 is selected has been fetched, the control unit 15 deletes the paper registration tab D11 corresponding to the first paper feeding cassette 131 from the layer. As a result, the entire paper registration tab D11 is hidden (S42).

Next, the control unit 15 correlates to the first paper feeding cassette 131 the attributes of the paper selected by the print job for which the first paper feeding cassette 131 is specified and stores them (S43).

Here, we will describe the print job. The print job is generated when the user indicates copying using the operating unit 14, and when the user indicates printing using the PC 20 connected to the copy machine 10, and is fetched by the control unit 15. In either case, it is possible to explicitly select one of the paper feeding cassettes, or to not do so. When the user does not explicitly select one of the paper feeding cassettes, a paper feeding cassette is automatically selected for which paper attributes that match the attributes of the paper selected by the user are correlated and stored in the control unit 15.

During the period when a portion or all of the paper registration tab D11 corresponding to the first paper feeding cassette 131 is displayed on the operating unit 14, with the control unit 15 fetching the print job for which the first paper feeding cassette 131 is selected as the status, there is a high possibility that a user who has refilled or replaced paper in the first paper feeding cassette 131 has instructed printing using the PC 20 connected to the copy machine 10. That user knows the attributes of the paper loaded in the first paper feeding cassette 131, and also knows that the attributes of the paper he loaded in the first paper feeding cassette 31 are not registered. The control unit 15, when the user loaded into the first paper feeding cassette 131 paper with different attributes from the attributes of the paper that user correlated to the first paper feeding cassette 131 and stored before removing the first paper feeding cassette 131 from the printing unit 16 to correlate and store the attributes of the paper selected with the print job for which the first paper feeding cassette 131 is specified to the first paper feeding cassette 131, if he selects as the print setting the attributes of the paper he himself loaded into the first paper feeding cassette 131, and explicitly selects the first paper feeding cassette 131 and gives instructions to print, it is possible to register the paper attributes without doing an operation on the paper registration tab D11.

7. Other Embodiments

The technical scope of the present invention is not limited by the embodiments described above, and of course it is possible to add various changes within a scope that does not stray from the gist of the present invention.

Figure 9A:
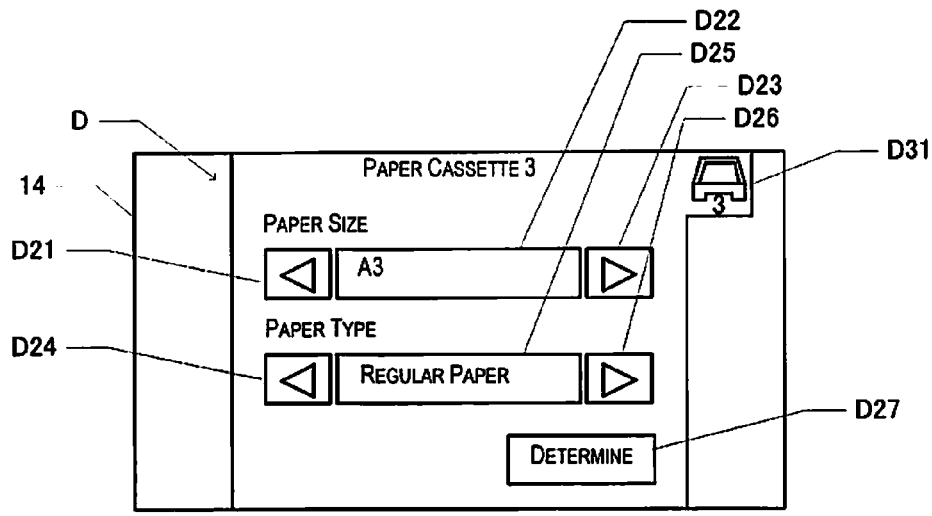
FIGS. 9A, 9B, and 9C are screen transition diagrams of another embodiment of the present invention.
Figure 9B:
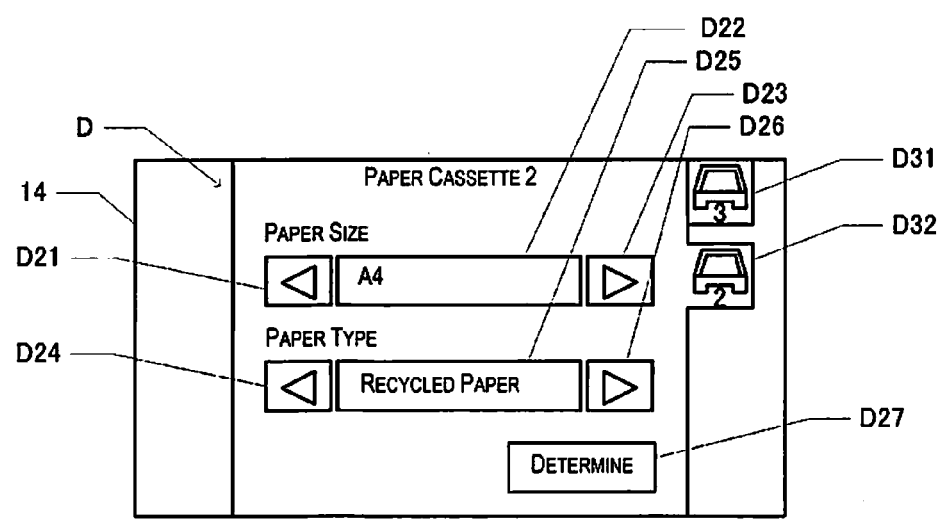
Figure 9C:
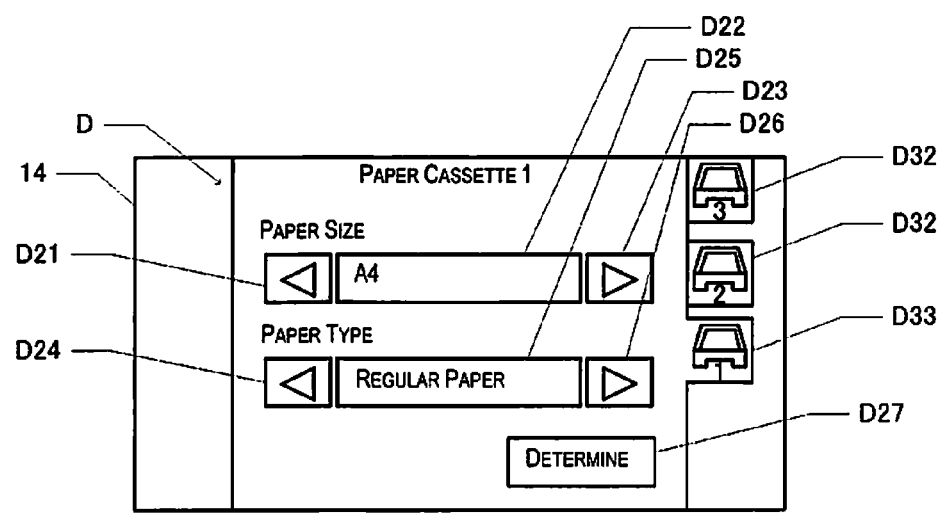

For example, it is also possible to have the arrangement of the convex part of the tab as the selection element for selecting the paper feeding cassette for which the paper attributes are correlated and registered be correlated not to the positional relationship of the paper feeding cassette but rather to the operating sequence on the paper feeding cassette. FIGS. 9A, 9B and 9C show an example of the paper registration tab when the arrangement of the right edge convex part is correlated to the operating sequence on the paper feeding cassette. First, when the third paper feeding cassette 133 is first mounted on the printing unit 16, as shown in FIG. 9A, the paper registration tab D31 corresponding to the third paper feeding cassette 133 is displayed. The constitution of the paper registration tab D31 is the same as that of the paper registration tab D11 except for the position of the right edge convex part. When the second paper feeding cassette 132 is mounted in the printing unit 16 before the determination button D27 of the paper registration tab D31 is selected, as shown in FIG. 9B, the paper registration tab D32 corresponding to the second paper feeding cassette 132 is displayed at the front-most surface, and the paper registration tab D31 is hidden except for the right edge convex part. When the first paper feeding cassette 131 is mounted in the printing unit 16 before the determination button D27 of the paper registration tab D32 is selected, as shown in FIG. 9C, the paper registration tab D31 corresponding to the first paper feeding cassette 131 is displayed at the front-most surface, and the paper registration tab D32 is hidden except for the right edge convex part. Here, the right edge convex part of the paper registration tab D31 corresponding to the first paper feeding cassette 131 is arranged lower than the right edge convex part of the paper registration tab D32, and lower than the right edge convex part of the paper registration tab D33 because the first paper feeding cassette 131 was mounted later than the second paper feeding cassette 132 and later than the third paper feeding cassette 133. Also, the right edge convex part of the third paper feeding cassette 133 is arranged higher than the right edge convex part of the paper registration tab D31 and the right edge convex part of the paper registration tab D31 because the third paper feeding cassette 133 was mounted before the first paper feeding cassette 131 and before the second paper feeding cassette 132.

Figure 10A:
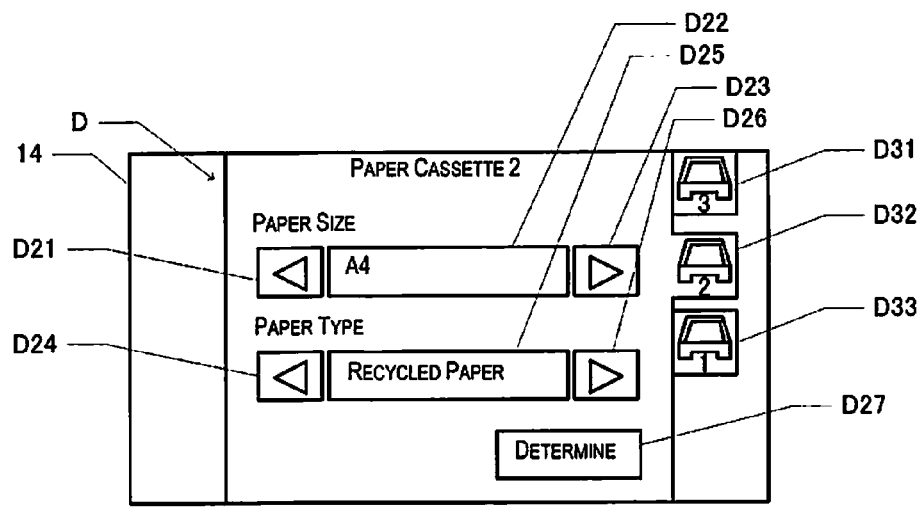
FIGS. 10A and 10B are screen transition diagrams of the embodiment of the present invention.
Figure 10B:
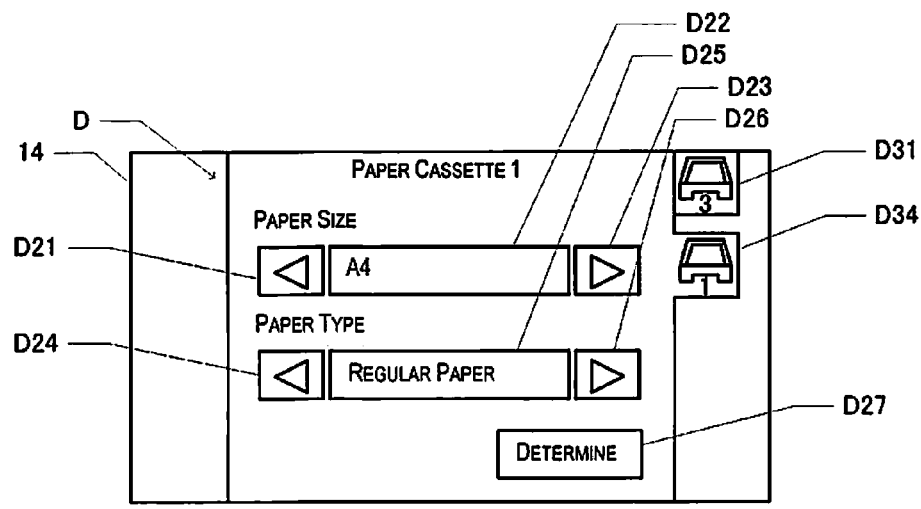

As shown in FIG. 9C, in a state with the paper registration tabs D31, D32, and D33 displayed, when the display area of the right edge convex part of the paper registration tab D32 is touched by the user, as shown in FIG. 10A, the entire paper registration tab D32 is displayed, and the remainder excluding the right edge convex part of the paper registration tab D31 corresponding to the first paper cassette 131 and of the paper registration tab D33 corresponding to the third paper feeding cassette 133 are hidden. As shown in FIG. 10A, in a state with the paper registration tabs D31, D32, and D33 displayed, when the display area of the determination button D27 is touched by the user, it is possible to simply have the paper registration tab D32 hidden, or possible to have the arrangement of the right edge convex part of the paper registration tab for which display remains be changed according to the mounting sequence of the paper feeding cassette corresponding to the paper registration tab for which the display remains. For example, when the paper registration tab D31 becomes hidden from the state shown in FIG. 10A, the mounting sequence of the first paper feeding cassette 131 corresponding to the paper registration tab D33 is moved up two positions with the overall paper feeding cassette for which the attributes of the corresponding paper are not registered. In this case, as shown in FIG. 10B, it is also possible to form the paper registration tab D34 for which the right edge convex part of the paper registration tab D33 was changed to the position corresponding to second place as the tab corresponding to the first paper feeding cassette 131.

Figure 11:
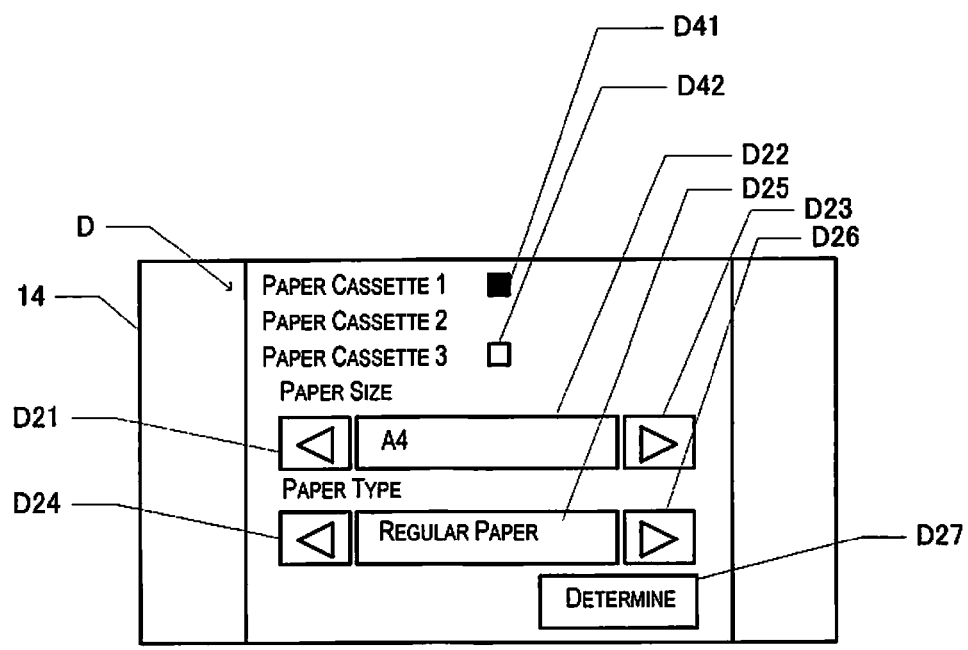
FIG. 11 is a screen transition diagram of another embodiment of the present invention.

Also, for example, it is possible to use a radio button, a list box, or the like as the selection element for selecting the paper feeding cassette for which the paper attributes are correlated and registered. FIG. 11 shows an example of the registration screen when using a radio button as the selection element. FIG. 11 shows the registration screen D displayed when the corresponding paper attributes are not registered after the first paper feeding cassette 131 and the third paper feeding cassette 133 are mounted in the printing unit 16. The registration screen D is a window in which are arranged a radio button D41 corresponding to the first paper feeding cassette 131 and a radio button D42 corresponding to the third paper feeding cassette 133. Because the second paper feeding cassette 132 is not subject to paper attribute registration, the radio button corresponding to the second paper feeding cassette 132 is not displayed. Also, when a plurality of radio buttons are arranged on the registration screen D, the positional relationship of the radio buttons matches the positional relationship of the paper feeding cassettes. Specifically, the first paper feeding cassette 131 is positioned higher than the third paper feeding cassette 133, so the radio button D41 corresponding to the first paper feeding cassette 131 is arranged higher than the radio button D42 corresponding to the third paper feeding cassette 133. The correlation of the text box D22, D25, the determination button D27, the selection buttons D21, D23, D24, and D26, and the paper feeding cassette are shown by the display state of the radio buttons D41 and D42.

Specifically, when the radio button D41 is displayed in a selected state, the attributes of the paper displayed on the text boxes D22 and D25 are correlated to the first paper feeding cassette 131 corresponding to the radio button D41 and stored by the determination button D27 being selected. Also, when the radio button D42 is displayed in a selected state, the attributes of the paper displayed in the text boxes D22 and D25 are correlated to the third paper feeding cassette 133 corresponding to the radio button D42 and stored by the determination button D27 being selected. Then, when the user touches the area in which the radio button is displayed, the display of that radio button is in a selected state, and the display of the other radio button is in a hidden state.

Figure 12A:
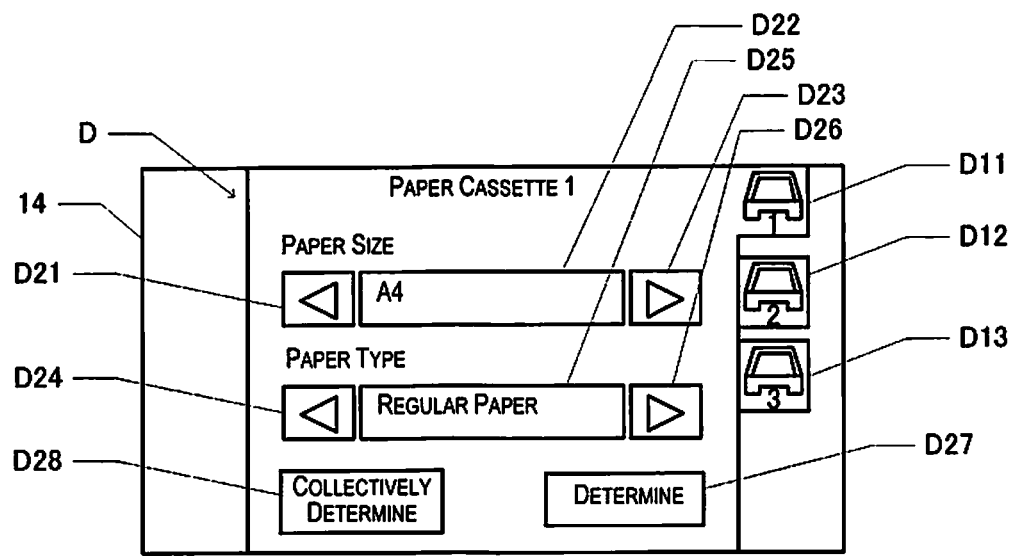
FIGS. 12A and 12B are screen transition diagrams of another embodiment of the present invention.
Figure 12B:
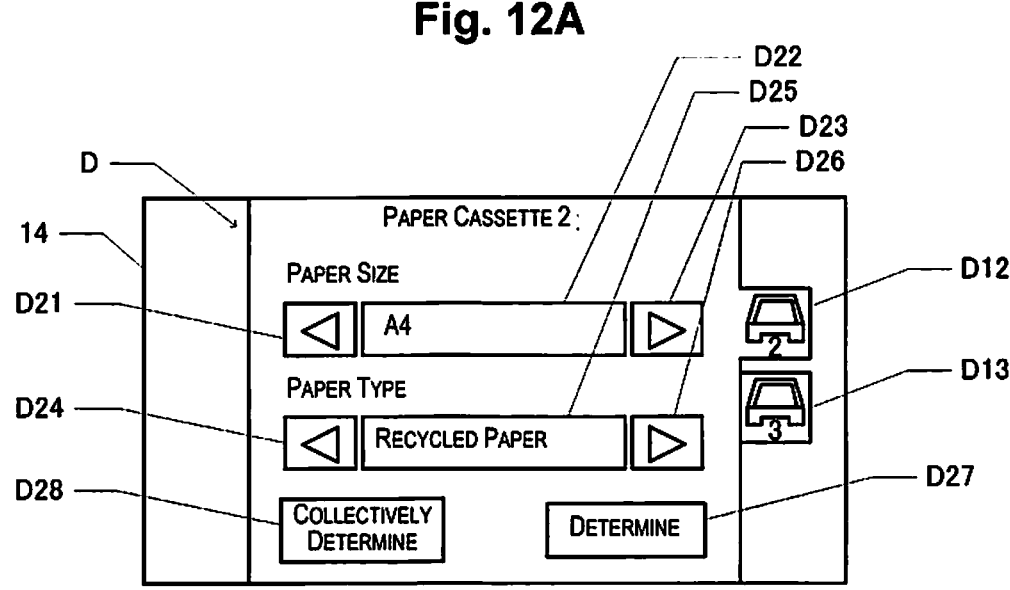

Also, for example, in a state when the attributes of the corresponding paper are not registered for the plurality of paper feeding cassettes, it is also possible to make it possible to collectively register the attributes of the corresponding paper for each of the respective plurality of paper feeding cassettes. In specific terms, for example as shown in FIG. 12A, when a collective determination button D28 is arranged as a collective registration button for the respective paper registration tabs D11, D12, and D13, and the user touches the display area of the collective determination button D28 arranged on any of the paper registration tabs, it is possible for the attributes of the currently selected paper to be stored for all of the first paper feeding cassette 131, the second paper feeding cassette 132, and the third paper feeding cassette 133. For example, as shown in FIG. 12A, when the paper registration tabs D11, D12, and D13 are displayed, when the display area of the determination button D27 as the individual registration button arranged on the paper registration tab D11 is touched, correlation is done to the first paper feeding cassette 131 corresponding to the paper registration tab D11, and the attributes of the paper displayed on the text boxes D22 and D25 arranged on the paper registration tab D11 are stored. Then, the paper registration tab D11 is hidden, and as shown in FIG. 12B, in a state with the paper registration tabs D12 and D13 displayed, when the user touches the display area of the collective determination button D28 arranged in the paper registration tab D12, the attributes of the paper displayed in the text boxes D22 and D25 arranged in the paper registration tab D12 are correlated to the second paper feeding cassette 132 corresponding to the paper registration tab D12 and stored, and the attributes of the paper that should be displayed in the text boxes D22 and D25 that are currently hidden though arranged in the paper registration tab D13 are correlated to the third paper feeding cassette 133 corresponding to the paper registration tab D13 and stored.

Also for example, it is possible to use one or more paper feeding trays that cannot be removed from the printing unit as the loading units, and to use the paper feeding cassettes and the paper feeding trays respectively as the loading units. It is also possible to use loading of the paper in that kind of paper feeding tray as the designated operation which will be the trigger for forming the registration screen. It is also possible to make the paper thickness, whiteness level or the like be a registration subject as an attribute of the printing media. Of course it is also possible to have the number of loading units be two or more, or four or more.

Also, for example, when the registration screen display area is wide enough, as the selection elements, it is possible to arrange the same number of windows without overlapping as the number of loading units for which the corresponding paper attributes after the designated operation is performed are not registered, and to arrange the registration elements in the respective windows. In this case, the positional relationship of each window can be made to correspond to the positional relationship of the corresponding loading units, or made to correspond to the paper feeding cassette mounting sequence, or the paper loading sequence. When the windows do not overlap, the entire window functions as a selection element.

Also, for example, when the second and thereafter paper feeding cassette is mounted, instead of displaying the paper registration tab corresponding to the paper feeding cassette mounted later at the front-most surface, it is possible to set the display priority sequence to the mounting sequence. Specifically, it is possible to arrange the paper registration tab corresponding to the paper feeding cassette mounted first at the front-most layer, and to arrange the paper registration tabs corresponding to the paper feeding cassettes mounted after that to the layer of the surface behind that.

Also, for example, it is possible to continue displaying a paper registration tab corresponding to a paper feeding cassette which does not require registration of the printing media attributes in advance, such as a paper feeding cassette left mounted as is or a paper feeding cassette for which the attributes are registered that is mounted after being taken out. In this case, it is preferable to make it possible to distinguish the paper registration tabs corresponding to the paper feeding cassette requiring registration of the printing media attributes from the paper registration tabs corresponding to the paper feeding cassettes not requiring registration of the print media attributes or the like by graying those out or the like. Also, at this time, it is possible to make it so that the paper registration tabs corresponding to the paper feeding cassettes for which registration of the printing media attributes is not required cannot be selected, but it is also possible to have it so the user can confirm which kind of paper is set in the paper feeding cassette for which it is not necessary to register the printing media attributes.

Also, for example, instead of using the touch panel display, it is possible to separately provide a display for displaying the registration screen and a switch panel as the print instruction unit.

Also, as an explanation of the operation, instead of repeating the designated time standby and confirmation, it is also possible to advance the process according to the operation being performed.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A printing system comprising:
   a plurality of media storages configured to be loaded with printing media,
   a printer configured to take out the printing media from a selected media storage, and configured to print on the printing media that has been taken out, and
   a processor configured to display on a display screen a registration screen for receiving registration of attributes of the printing media loaded in one of the media storages in response to the one of the media storages being removed from or installed to the printer, and configured to store the attributes of the printing media in response to the registration being received using the registration screen,
   the processor being further configured to display a selection element corresponding to the one of the media storages on the registration screen so as to be selectable in response to the one of the media storages being removed from or installed to the printer,
   the processor being further configured to delete from the registration screen the selection element corresponding to the one of the media storages in response to the attributes of the printing media being registered for the one of the media storages on the registration screen, and
   the processor being further configured to display on the registration screen a registration element for registering the attributes of the printing media loaded in the one of the media storage corresponding to the selection element in response to the selection element being selected by a user operation while displaying another registration element corresponding to another selection element.

2. The printing system according to claim 1, wherein the selection elements are tabs.

3. The printing system according to claim 1, wherein the processor, upon arranging the selection elements on the registration screen, configured to arrange the respective selection elements on the registration screen in a positional relationship corresponding to a positional relationship of the media storages relative to each other.

4. The printing system according to claim 1, wherein the processor, upon arranging the selection elements on the registration screen, configured to arrange the respective selection elements on the registration screen in a positional relationship corresponding to a sequence in which the designated operation has been performed.

5. The printing system according to claim 1, wherein the designated operation includes loading of the printing media to the media storage, and
the processor is configured not to arrange on the registration screen the selection elements and the registration elements for the media storages in which the printing media are not loaded.

6. The printing system according to claim 1, further comprising
a print instruction unit configured to select any of the media storages and give printing instructions,
the processor, when the media storage for which the corresponding selection element is arranged on the registration screen is selected and the printing is instructed, being configured to remove the selection element corresponding to the selected media storage from the registration screen, and being configured to store attributes specified with the instructed printing as the attributes of the printing media loaded in the selected media storage.

7. The printing system according to claim 1, wherein the registration elements include a collective registration button for performing collective registration of attributes for all the selection elements arranged on the registration screen.

8. The printing system according to claim 1, wherein the registration elements include an individual registration button for registering attributes of the selected selection element.

9. The printing system according to claim 1, wherein the selection elements are arranged in the registration screen such that the selection elements at least partially non-overlap with respect to each other, and the registration elements are arranged in the registration screen such that the registration elements at least partially overlap with respect to each other.

\* \* \* \* \*